(12) United States Patent
Redden

(10) Patent No.: US 6,539,615 B2
(45) Date of Patent: Apr. 1, 2003

(54) IN-LINE LUG BRUSHING ASSEMBLY

(75) Inventor: Galen H. Redden, Gypsum, KS (US)

(73) Assignee: Daramic, Inc., Charlotte, NC (US)

( * ) Notice: Subject to any disclaimer, the term of this patent is extended or adjusted under 35 U.S.C. 154(b) by 224 days.

(21) Appl. No.: 09/781,170

(22) Filed: Feb. 12, 2001

(65) Prior Publication Data

US 2001/0029663 A1 Oct. 18, 2001

Related U.S. Application Data

(60) Provisional application No. 60/181,781, filed on Feb. 11, 2000.

(51) Int. Cl.[7] ............................ B23P 19/00; B23P 13/00
(52) U.S. Cl. .................. 29/730; 29/2; 29/623.1; 429/211; 429/225
(58) Field of Search ..................... 29/623.1, 730, 29/2; 429/211, 225

(56) References Cited

U.S. PATENT DOCUMENTS

| | | | | |
|---|---|---|---|---|
| 5,901,400 A | * | 5/1999 | Fulop | 15/88 |
| 6,006,439 A | * | 12/1999 | Del Mercado et al. | 34/61 |
| 6,330,728 B2 | * | 12/2001 | Ueki et al. | 15/77 |

* cited by examiner

Primary Examiner—Carol Chaney
Assistant Examiner—Angela J. Martin
(74) Attorney, Agent, or Firm—Robert H. Hammer, III

(57) ABSTRACT

A lug brushing assembly (10) that brushes the lugs of battery plates in an in-line manner so as to eliminate extra battery plate handling procedures. The lug brushing assembly (10) more effectively cleans the lugs of battery plates without causing excessive wearing of the brushes or abrasion on the lugs.

15 Claims, 5 Drawing Sheets

IN-LINE LUG BRUSHING ASSEMBLY

RELATED APPLICATIONS

This application claims priority benefit of provisional application titled "IN-LINE AND ADD-A-PLATE LUG BRUSHING ASSEMBLIES", Ser. No. 60/181,781, filed Feb. 11, 2000, which is hereby incorporated into the present application by reference.

BACKGROUND OF THE INVENTION

1. Field of the Invention

The present invention relates to batteries and battery manufacturing machines. More particularly, the invention relates to a lug brushing assembly that brushes the lugs on individual battery plates before they are connected to form a battery.

2. Description of the Prior Art

Conventional lead-acid batteries include a plurality of battery plates placed in a housing, each having a battery lug extending therefrom. The lugs are typically welded to cast-on straps which are in turn connected to terminals extending from the housing. Lead oxide and other contaminants, which often accumulate on battery plate lugs during manufacture of the plates, impedes welding of the lugs. Therefore, it is desirable to brush the excess lead oxide off the lugs before they are welded together.

A significant limitation of prior art lug brushing or cleaning assemblies is that they are stand-alone devices that brush the lugs on battery plates separate from other battery plate handling stations. These prior art assemblies therefore require additional plate handling procedures that increase the costs and time associated with the manufacture of batteries.

Another limitation of prior art lug brushing assemblies is that they typically include stacked pairs of counter rotating brushes that are spaced closely together to define a nip region therebetween. Battery plate lugs are passed through the nip region so that one brush cleans the top of the lugs and the other brush simultaneously cleans the bottom of the lugs. Unfortunately, this arrangement causes premature wearing of the brushes and excessive abrasion on the lugs because the lugs are squeezed or sandwiched between the rotating brushes as they are cleaned.

SUMMARY OF THE INVENTION

The present invention solves the above-described problems and provides a distinct advance in the art of lug brushing assemblies. More particularly, the present invention provides an improved lug brushing assembly that brushes the lugs of battery plates in an in-line manner so as to eliminate extra battery plate handling procedures. Moreover, the lug brushing assembly of the present invention more effectively cleans the lugs of battery plates without causing excessive wearing of the brushes or abrasion on the lugs.

The lug brushing assembly is preferably configured for placement between a plate enveloper and a plate stacker so that it cleans the lugs on battery plates after they have been enveloped in insulation but before they are stacked for placement in battery housings. The lug brushing assembly, the plate enveloper, and the plate stacker together with possibly other components make up an overall plate handling apparatus used in the manufacture of battery plates and batteries.

The preferred lug brushing assembly includes a plurality of upper lug brushes, a plurality of lower lug brushes, a drive assembly, and a rocker assembly. The upper lug brushes brush the top sides of the lugs on battery plates as they pass through the assembly, and the lower lug brushes brush the bottom sides of the lugs. The drive assembly rotates the upper and lower lug brushes, and the rocker assembly reciprocates the brushes up and down so that the brushes briefly contact the lugs as the battery plates pass thereby. The drive assembly preferably delivers the battery plates to the lug brushes in a trailing fashion so that the lugs on the battery plates initially extend away from the lug brushes as the battery plates enter the lug brushing assembly.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
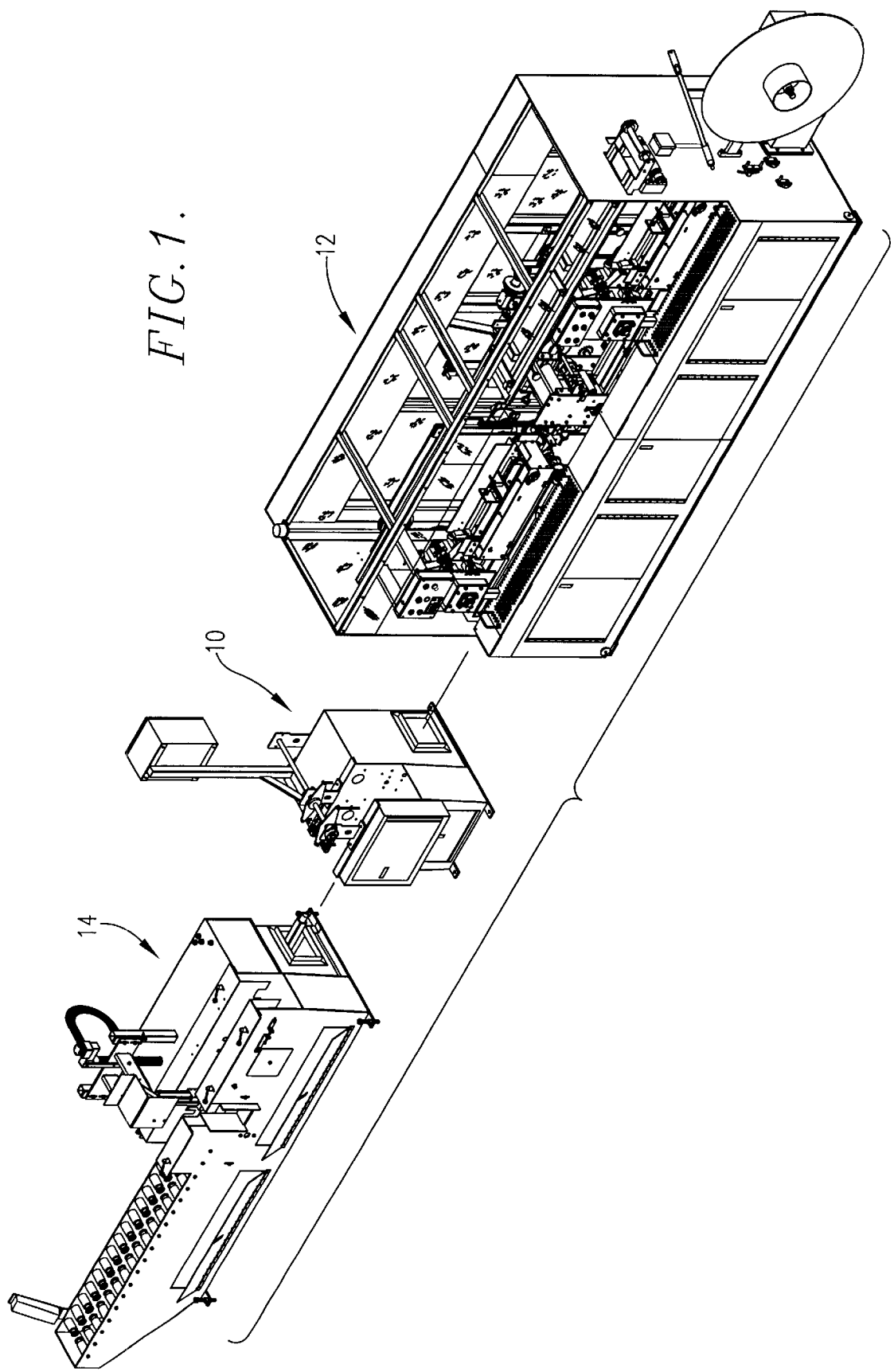
FIG. 1 is an exploded isometric view of an in-line lug brushing assembly constructed in accordance with a preferred embodiment of the present invention and shown together with a battery plate enveloper and a battery plate stacker.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 5:
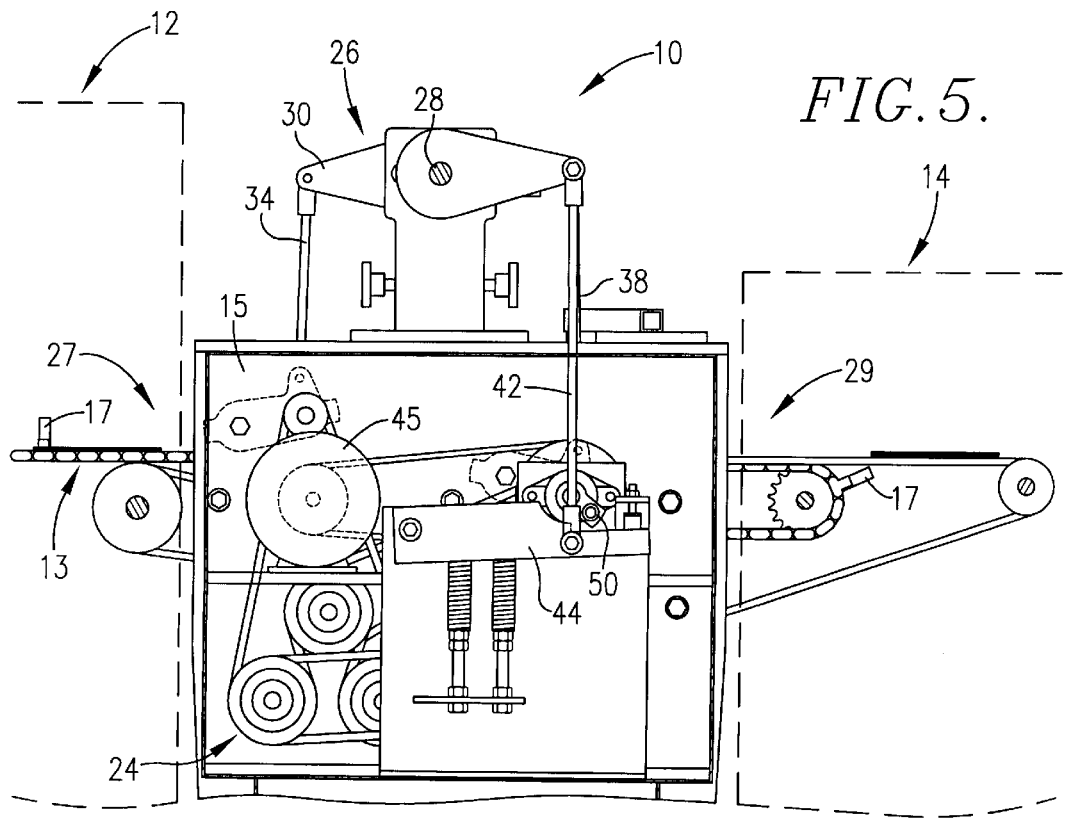
FIG. 5 is a vertical section of the lug brushing assembly showing the clutch drive and cam plate.
Figure 8:
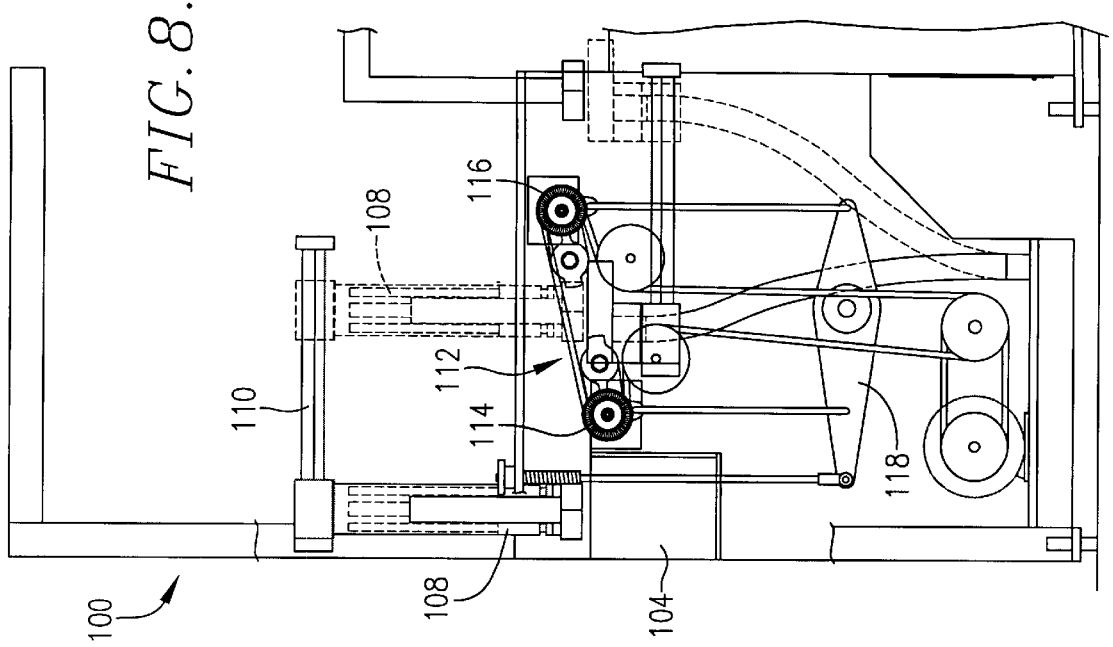
FIG. 8 is a side view of the lug brushing assembly of FIG. 6.
Figure 7:
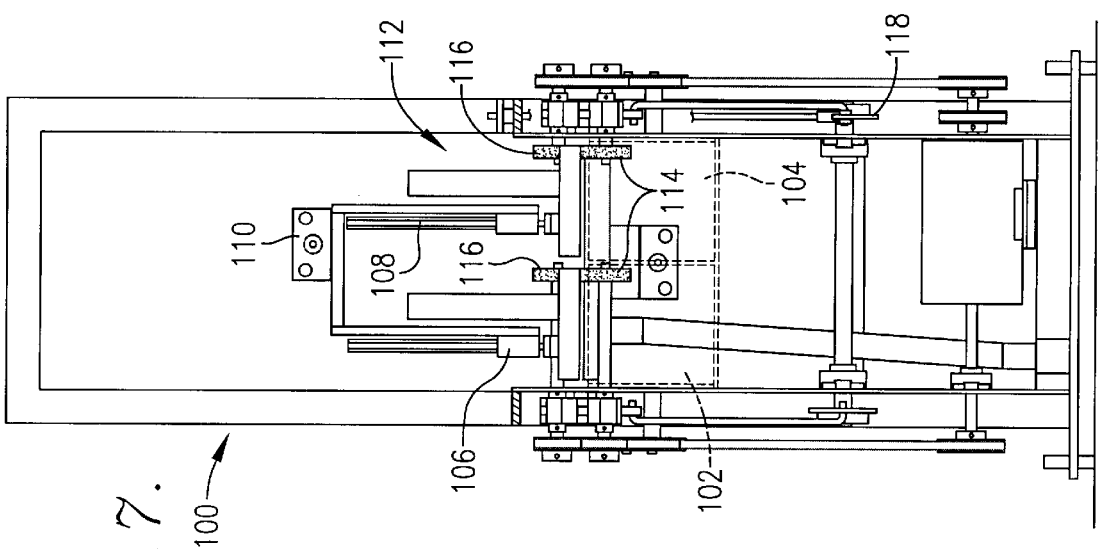
FIG. 7 is an end view of the lug brushing assembly of FIG. 6.
Figure 6:
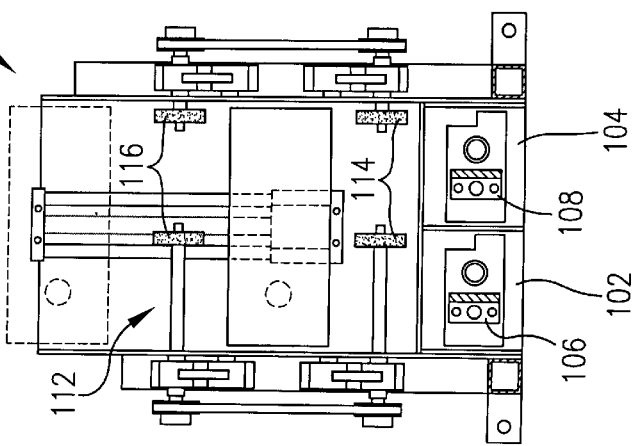
FIG. 6 is a top view of an add-a-plate lug brushing assembly constructed in accordance with a second preferred embodiment of the present invention.

Turning now to the drawing figures, FIGS. 1–5 illustrate an in-line lug brushing assembly 10 constructed in accordance with a first preferred embodiment of the invention, and FIGS. 6–8 illustrate an add-a-plate lug brushing assembly 100 constructed in accordance with a second preferred embodiment of the invention. Each of these assemblies is discussed separately below.

In-Line Lug Brushing Assembly

Referring to FIG. 1, the in-line lug brushing assembly 10 is configured for placement between a plate enveloper 12 and a plate stacker 14 so that it cleans the lugs on battery plates after they have been enveloped in insulation by the enveloper 12 but before they are stacked for placement in battery housings by stacker 14. The lug brushing assembly 10, the plate enveloper 12, and the plate stacker 14 together with possibly other components make up an overall plate handling apparatus used in the manufacture of battery plates and batteries.

The plate enveloper 12 may be any conventional plate enveloper but is preferably the GSA-Plus model plate enveloper manufactured and sold by Gelco International L. L. C. The plate enveloper 12 envelopes battery plates and feeds the plates in side-by-side pairs to the input of the lug brushing assembly 10. The plates are carried from the plate enveloper 12 to and through the lug brushing assembly 10 on a chain drive assembly 13 having a plurality of upwardly extending spaced lugs 17 that push the plates through the lug brushing assembly. The chain is preferably driven by a main drive that is separate from the lug brushing assembly. The plate stacker 14, which is also preferably manufactured and sold by Gelco International L. L. C., receives battery plates after their lugs have been brushed by the lug brushing assembly 10 and then stacks the plates in desired quantities so that they can be easily placed in battery housings.

Figure 2:
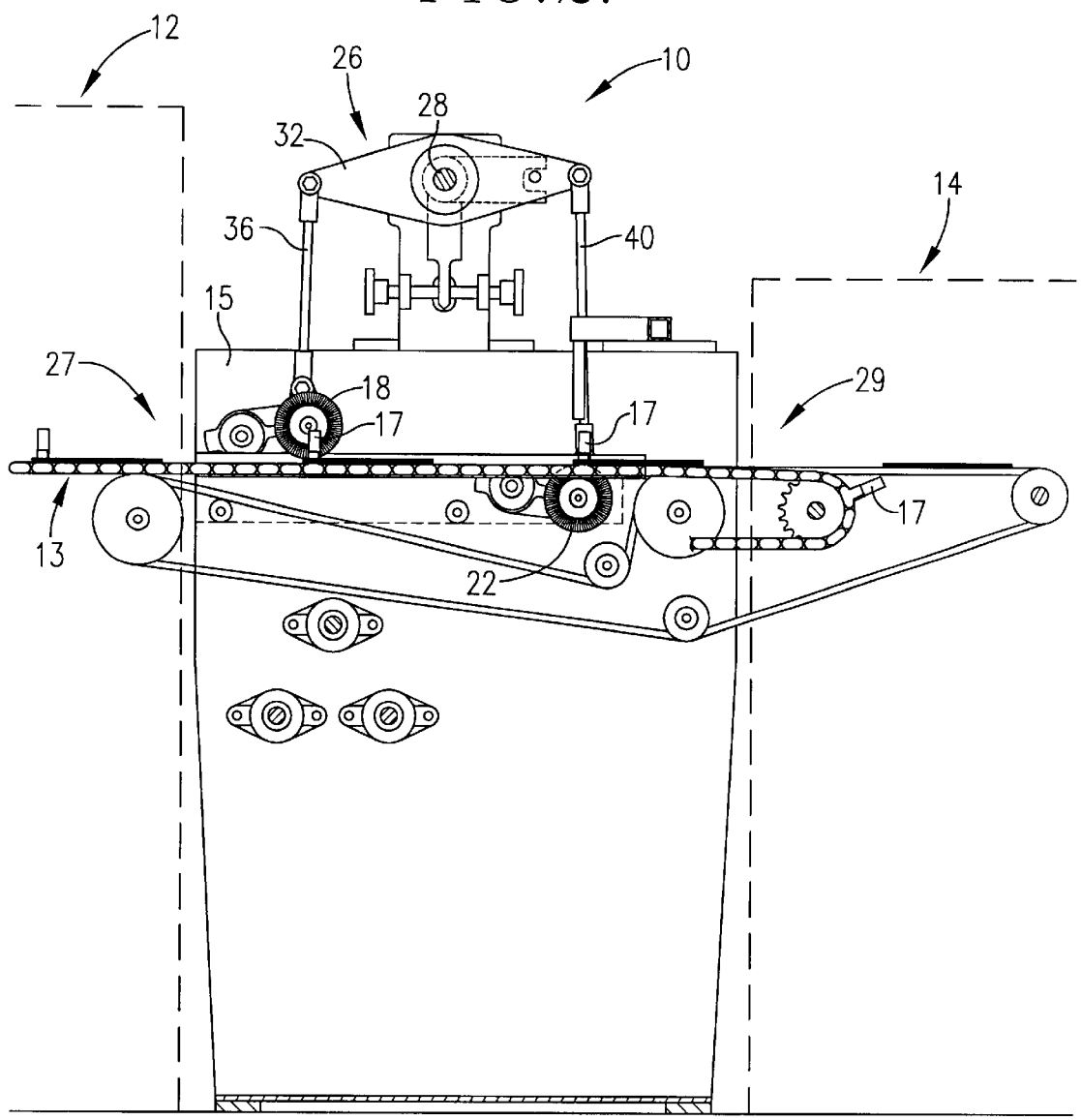
FIG. 2 is a central vertical section of the lug brushing assembly.
Figure 3:
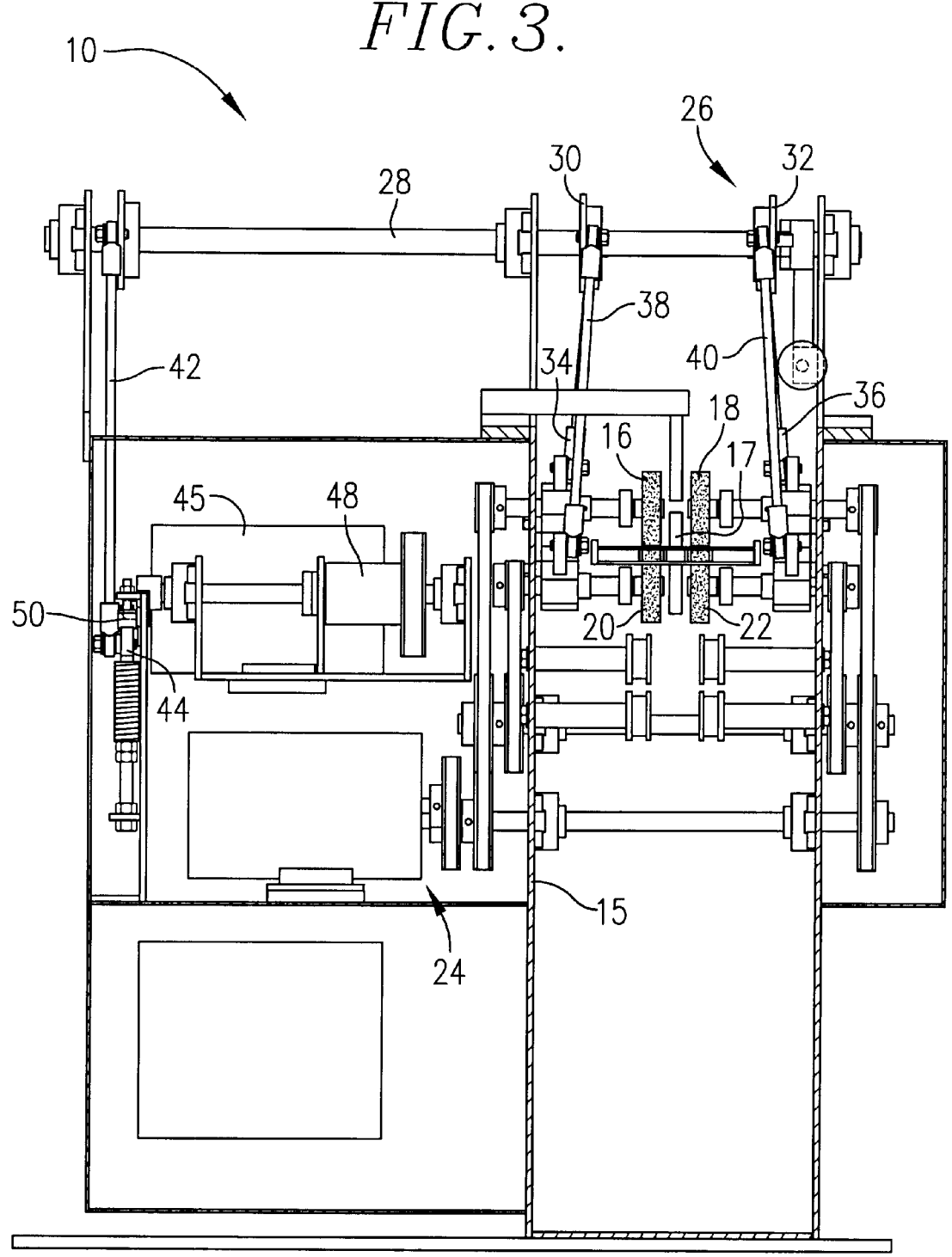
FIG. 3 is an end view of the lug brushing assembly.
Figure 4:
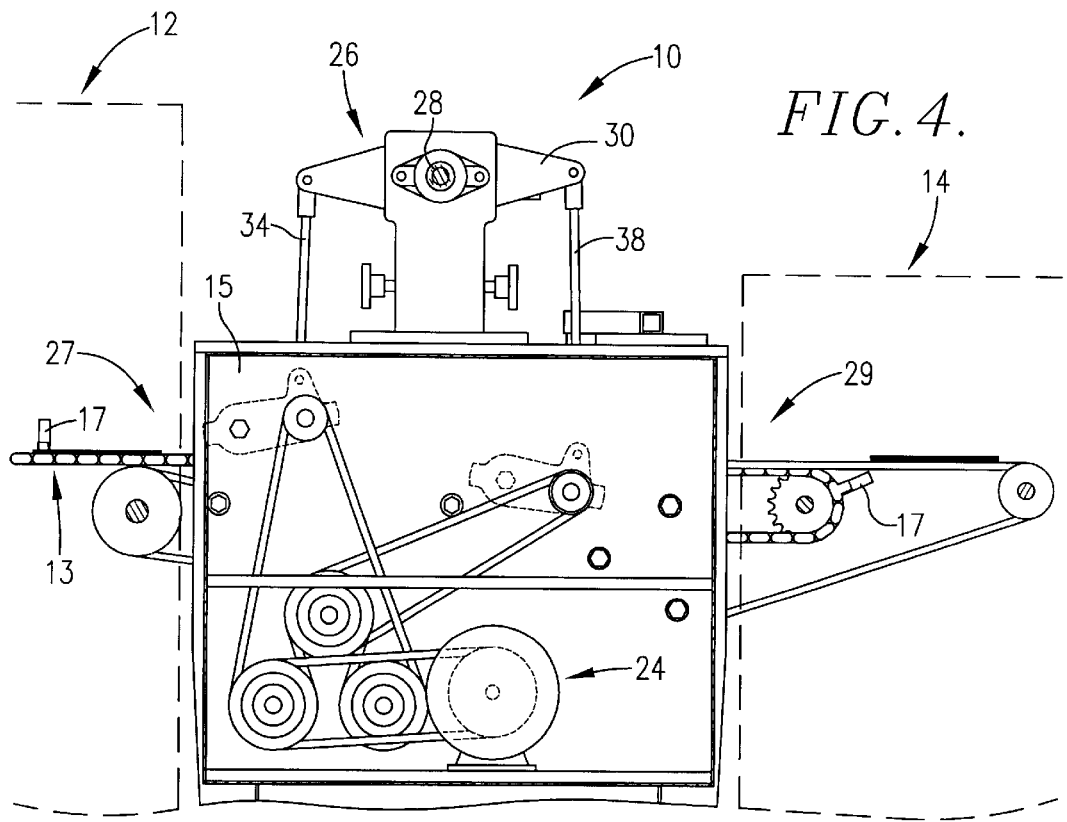
FIG. 4 is a vertical section of the lug brushing assembly showing the brush and drive assembly.

Referring to FIGS. 2 and 3, the lug brushing assembly 10 broadly includes a housing or support frame 15, a pair of upper lug brushes 16, 18 supported by the housing 15 for brushing the top sides of battery plate lugs as they pass through the assembly 10, a pair of lower lug brushes 20, 22 supported by the housing 15 for brushing the bottom sides of the lugs, a drive assembly 24 for rotating the upper and lower lug brushes 16, 18, 20, 22 and a rocker assembly 26 for reciprocating the upper and lower lug brushes 16, 18, 20, 22 up and down so that they briefly contact the lugs as the battery plates pass thereby as described in more detail below. The brushes can be adjusted up and down to achieve any desired height above the battery plates to accommodate for various sizes of brushes and brush wear.

The housing or support frame 15 has an entry 27 configured for attachment with the plate enveloper 12 and an exit 29 configured for attachment with the plate stacker 14. The lug brushing assembly 10 is placed in-line between the plate enveloper 12 and the plate stacker 14 for receiving battery plates from the plate enveloper 12 and then discharging the battery plates to the plate stacker 14.

The upper and lower lug brushes 16, 18, 20, 22 are preferably conventional steel brushes but may also be formed of other suitable materials. The drive assembly 24 includes motor driven pulleys and belts that rotate the brushes at approximately 2,000 RPM and in a direction to minimize abrasion on the envelopes on the plates. Specifically, as viewed from the orientation of FIG. 2, the main chain drive delivers battery plates to the lug brushing assembly 10 in a trailing fashion so that the lugs on the plates extend toward the plate enveloper 12 (to the left) as they enter the lug brushing assembly 10. The drive assembly 24 rotates the top pair of brushes 16, 18 in a clockwise direction and rotates the bottom brushes 20, 22 in a counterclockwise direction so that the brushes do not snag on the envelopes covering the plates as the plates pass through the lug brushing assembly 10.

The rocker assembly 26 includes a central shaft 28, a pair of rocker arms 30, 32 fixed to the shaft, and a plurality of brush links 34, 36, 38, 40 extending from the ends of the rocker arms 30, 32 and each attached to one of the brushes. The end of the central shaft 28 opposite the rocker arms 30, 32 is coupled with a link 42 that is in turn connected to a cam plate 44 having a curved cam surface as best depicted in FIG. 5. A motor 45 connected to a clutch 48 rotates a cam follower wheel 50 that contacts the cam surface as it rotates to reciprocate the cam plate 44 and the attached link 42 up and down. The link 42 in turn alternately rotates the central shaft 28 a fraction of a revolution in each direction in a reciprocating manner to rock the brush links 34, 36, 38, 40 up and down to in turn shift the brushes up and down.

The rocker assembly 26 is configured to simultaneously lower the upper brushes 16, 18 into contact with the top surfaces of the lugs on a pair of battery plates entering the assembly 10 and to raise the lower brushes 20, 22 into contact with the bottom surfaces of the lugs on a pair of battery plates exiting the assembly 10. Thus, the top and bottom sides of any given lug are not brushed simultaneously so as to prevent excessive wear or abrasion on the lugs. The brushes 16, 18, 20, 22 are preferably moved into contact with the lugs for only approximately 50 milliseconds to briefly clean the lugs without causing excessive abrasion.

The lugs on the main drive chain carrying the battery plates through the lug brushing assembly 10 are spaced apart the same distance as are the upper and lower brushes 16, 18, 20, 22 so that the lug brushing assembly 10 simultaneously cleans the top surface of two lugs while cleaning the bottom surface of two other lugs.

Although the invention has been described with reference to the preferred embodiment illustrated in the attached drawing figures, it is noted that equivalents may be employed and substitutions made herein without departing from the scope of the invention as recited in the claims. For example, the rocker assembly may be replaced by a plurality of solenoids for raising and lowering the brushes in the same manner as described above.

Add-A-Plate Lug Brushing Assembly

The lug brushing assembly 100 illustrated in FIGS. 6–8 is configured for cleaning the lugs on battery plates that are to be individually inserted into a battery plate stacker. The assembly includes a pair of hoppers 102, 104 for holding stacks of battery plates, a pair of thrusters 106, 108 having vacuum pickup heads for picking up the topmost plates in the hoppers, and a horizontal thruster 110 for carrying the vacuum heads and picked-up battery plates past a brushing assembly 112. The brushing assembly includes a pair of spaced apart brushes, one 114 for brushing the bottom surface of the lugs, and another 116 for brushing the top surface of the lugs. The brushes normally are not shifted during operation but may be adjusted up and down by a rocker assembly 118 for maintenance and adjustment purposes. Once the horizontal thruster assembly carries the plates through the brushing assembly, it releases the vacuum so that the plates may be individually fed into a battery stacking device.

Having thus described the preferred embodiment of the invention, what is claimed as new and desired to be protected by Letters Patent includes the following:

1. A battery plate handling apparatus for handling battery plates used to manufacture lead-acid batteries, the plate handling apparatus comprising:

a plate enveloper for receiving a plurality of battery plates and for enveloping at least some of the battery plates in insulative material; and a lug brushing assembly coupled with and placed in-line with the plate enveloper for receiving the battery plates from the plate enveloper and for brushing lugs on the battery plates to remove contaminates therefrom.

2. The battery plate handling apparatus as set forth in claim 1, further including a plate stacker coupled with and placed in-line with the lug brushing assembly for receiving the battery plates from the lug brushing assembly and for stacking the battery plates so that the battery plates may be easily placed in battery housings.

3. The battery plate handling apparatus as set forth in claim 1, the lug brushing assembly comprising:

a plurality of upper lug brushes for brushing top sides of the lugs as the battery plates pass through the lug brushing assembly;

a plurality of lower lug brushes for brushing bottom sides of the lugs as the battery plates pass through the lug brushing assembly;

a drive assembly for rotating the upper and lower lug brushes; and a rocker assembly for reciprocating the upper and lower brushes up and down so that the upper and lower brushes briefly contact the lugs as the battery plates pass thereby.

4. The battery plate handling apparatus as set forth in claim 3, wherein the drive assembly delivers battery plates to the upper and lower lug brushes in a trailing fashion so that the lugs on the battery plates initially extend away from the upper and lower lug brushes as the battery plates enter the lug brushing assembly.

5. The battery plate handling apparatus as set forth in claim 3, wherein the rocker assembly is configured to simultaneously lower the upper brushes into contact with top surfaces of the lugs of a first set of battery plates and raise the lower brushes into contact with bottom surfaces of the lugs of a second set of battery plates.

6. The battery plate handling apparatus as set forth in claim 1, wherein the lug brushing assembly is configured for simultaneously receiving two side-by-side battery plates and for simultaneously brushing lugs on the side-by-side battery plates.

7. A battery plate handling apparatus for handling battery plates used to manufacture lead-acid batteries, the plate handling apparatus comprising:

a plate enveloper for receiving a plurality of battery plates and for enveloping at least some of the battery plates in insulative material;

a lug brushing assembly coupled with and placed in-line with the plate enveloper for receiving the battery plates from the plate enveloper and for brushing lugs on the battery plates to remove contaminates therefrom, the lug brushing including a plurality of upper lug brushes for brushing top sides of the lugs as the battery plates pass through the lug brushing assembly, a plurality of lower lug brushes for brushing bottom sides of the lugs as the battery plates pass through the lug brushing assembly, a drive assembly for rotating the upper and lower lug brushes, and a rocker assembly for reciprocating the upper and lower brushes up and down so that the upper and lower brushes briefly contact the lugs as the battery plates pass thereby; and a plate stacker coupled with and placed in-line with the lug brushing assembly for receiving the battery plates from the lug brushing assembly and for stacking the battery plates so that the battery plates may be easily placed in battery housings.

8. The battery plate handling apparatus as set forth in claim 7, wherein the drive assembly delivers battery plates to the upper and lower lug brushes in a trailing fashion so that the lugs on the battery plates initially extend away from the upper and lower lug brushes as the battery plates enter the lug brushing assembly.

9. The battery plate handling apparatus as set forth in claim 7, wherein the rocker assembly is configured to simultaneously lower the upper brushes into contact with top surfaces of the lugs of a first set of battery plates and raise the lower brushes into contact with bottom surfaces of the lugs of a second set of battery plates.

10. The battery plate handling apparatus as set forth in claim 7, wherein the lug brushing assembly is configured for simultaneously receiving two side-by-side battery plates and for simultaneously brushing lugs on the side-by-side battery plates.

11. A lug brushing assembly for brushing lugs on battery plates to remove contaminates therefrom, the lug brushing assembly comprising:

an entry configured for placement in-line with a plate enveloper for receiving a plurality of battery plates from the plate enveloper;

a plurality of lug brushes for brushing the lugs on the battery plates received from the plate enveloper; and an exit configured for placement in-line with a plate stacker for delivering the battery plates to the plate stacker.

12. The lug brushing assembly as set forth in claim 11, the lug brushes including plurality of upper lug brushes for brushing top sides of the lugs as the battery plates pass through the lug brushing assembly; and a plurality of lower lug brushes for brushing bottom sides of the lugs as the battery plates pass through the lug brushing assembly.

13. The lug brushing assembly as set forth in claim 12, further including a a drive assembly for rotating the upper and lower lug brushes; and a rocker assembly for reciprocating the upper and lower brushes up and down so that the upper and lower brushes briefly contact the lugs as the battery plates pass thereby.

14. A lug brushing assembly for brushing lugs on battery plates to remove contaminates therefrom, the lug brushing assembly comprising:

a hopper for holding stacks of the battery plates;

a thruster for picking up a topmost plate from the hopper; and a brushing assembly for receiving the plate from the thruster and brushing the lug on the plate.

15. The lug brushing assembly as set forth in claim 14, further including an additional thruster for carrying the plate from the brushing assembly to a battery stacker.

* * * * *